United States Patent [19]
Farris

[11] Patent Number: 5,232,478
[45] Date of Patent: Aug. 3, 1993

[54] ELECTRONIC AIR FILTER

[76] Inventor: Richard W. Farris, 429 W. 6th St., Wahoo, Nebr. 68066

[21] Appl. No.: 792,344

[22] Filed: Nov. 14, 1991

[51] Int. Cl.$^5$ .............................................. B03C 3/68
[52] U.S. Cl. ...................................... 55/104; 55/126; 55/139; 55/356; 55/422
[58] Field of Search ...................... 55/6, 104, 124, 126, 55/139, 422, 527, 356, 521; 210/357

[56] References Cited

U.S. PATENT DOCUMENTS

| | | | |
|---|---|---|---|
| 2,969,127 | 1/1961 | Cook | 55/126 |
| 3,086,342 | 4/1963 | Goettl | 55/422 X |
| 3,438,180 | 4/1969 | Klouda | 55/124 X |
| 3,735,560 | 5/1973 | Wellman | 55/129 |
| 3,763,633 | 10/1973 | Soltis | 55/126 |
| 3,793,813 | 2/1974 | McAllister | 55/521 X |
| 4,007,024 | 2/1977 | Sallee et al. | 55/126 |
| 4,026,684 | 5/1977 | Finger | 55/126 |
| 4,133,653 | 1/1979 | Soltis | 55/126 |
| 4,341,537 | 7/1982 | Rodgers | 55/139 |
| 4,507,131 | 3/1985 | Fathauer et al. | 55/104 |
| 4,549,887 | 10/1985 | Joannou | 55/131 |
| 4,651,264 | 3/1987 | Shiao-Chung Hu | 363/18 |
| 4,652,988 | 3/1987 | McLain, Sr. et al. | 363/146 |
| 4,702,752 | 10/1987 | Yanagawa | 55/131 |
| 4,759,778 | 7/1988 | Conrad | 55/131 |
| 4,828,586 | 5/1989 | Joannou | 55/131 |
| 4,886,526 | 12/1989 | Joannou | 55/131 |
| 4,902,306 | 2/1990 | Burnett et al. | 55/6 |
| 4,944,778 | 7/1990 | Yanagawa | 55/131 |

OTHER PUBLICATIONS

Brochure—Honeywell Electronic Air Cleaners "Switch to a Better Environment", Feb. 20, 1990.

Primary Examiner—Richard L. Chiesa
Attorney, Agent, or Firm—Zarley, McKee, Thomte, Voorhees & Sease

[57] ABSTRACT

An electronic air filter includes a rectangular metal frame supporting a layered assembly composed of a metal grid interposed between a pair of sheets of non-conductive filter media, and a pair of metal grills located on opposite sides of the filter media to support the filter media sheets and grid. The frame and layered assembly form a collector cell, which has a waterproof high voltage power supply unit mounted therein and electrically connected to the grid and grills so as to form an electrostatic filter. The power supply unit is electrically connected to an electrical jack on the frame, with a power pack located remote of the collector cell and connected to the jack to provide low voltage electrical current to the power supply unit. The collector cell has dimensions corresponding to the dimensions of a conventional disposable filter, for direct substitution therewith. A plurality of strips of dense polyester felt material are connected between the grid and the grills to shunt electrical current to the grills when one or more of the strips are saturated with water, and to electrically insulate the grid from the grills when the strips are dry. A second frame and filter is pivotally connected to the first frame to form a foldable filter.

7 Claims, 4 Drawing Sheets

ELECTRONIC AIR FILTER

TECHNICAL FIELD

The present invention relates generally to air filters for conventional residential and commercial central heating and cooling systems, and more particularly to an improved electronic air filter.

BACKGROUND OF THE INVENTION

Most U.S. residential and commercial buildings are equipped with central forced air heating and/or cooling systems. Indoor air is drawn into the system by the central blower, pumped through the central unit where it is heated or cooled, then redistributed throughout the building. A mechanical air filter is positioned upstream of the central blower to filter air which is to be heated or cooled and thence distributed. The vast majority of these filters are composed of a coarse filter media such as glass or polyester fiber, supported in a paperboard frame and slidably installed within a channel formed in the central unit blower compartment or return air duct work. Such filters are considered "disposable", since the composition and construction of the filters makes it economically unattractive to attempt to clean and reuse the filter.

The major fault with disposable or "non-permanent" filters lies in the fact that the requisite high porosity of the filter causes the efficiency of the filter to decrease radically with respect to airborne particle size below 100 microns in diameter, so as to become virtually ineffective on particles below 10 microns in diameter.

In order to obtain a more efficient filter, the principle electrostatically charged filtering media has been utilized for many years. Conventionally, a high voltage is applied to a metallic grid which is located adjacent a layer of dielectric filter media. A metallic grill is located on the opposing side of the filter media such that an electrostatic field is produced between the charged grid and the grounded grill. The electrostatic field thus created polarizes the filter media as well as any particles in the air passed through the filter. This polarization greatly increases the tendency of airborne particulate to adhere to the surfaces of the filter media, thereby significantly increasing the overall efficiency of the filtering process.

While electrostatic filtering systems have been known for many years, they still suffer drawbacks. Because electrostatic filters may be cleaned and reused, they are commonly described as "permanent" filters. Prior art permanent electrostatic filters are commonly manufactured with a collecting cell which is removably installed in the central forced air system, and have a separate power supply electrically connected to the collecting cell. Thus, a length of high voltage electrical line must extend from the power supply to the collecting cell. Such an electrical line is necessarily both relatively cumbersome and permanently attached to the collecting cell thereby complicating the installation, removal, and cleaning of the collecting cell.

Another drawback of prior art electrostatic filters relates to the methods utilized in cleaning such filters. The simplest and most effective method for cleaning permanent electrostatic filters is the utilization of a common household automatic dishwasher. This method of cleaning, however, is not available to the majority of the owners of permanent filters, because approximately two-thirds of all permanent filters are 24 or more inches in length. Since the standard domestic dishwasher has dimensions which would accept filters of only about 20 inches in length, the owners of filters of a greater length are excluded from this convenient cleaning method. Rather, they must resort to manual cleaning of the filters by spraying or saturating the filter with water in a large container, sink, or the like.

As described above, cleaning conventional permanent electronic air filters involves saturating the collecting cell in water. If the air filter is reinstalled in the furnace and energized before the collecting cell has dried, high voltage arcing will occur through the filter media between the high voltage grid and the grounded grills. While such arcing is not necessarily damaging, it creates a loud annoying "popping" sound which can continue for an appreciable length of time. Prior to the applicant's invention, the "solution" to this problem generally entailed leaving the saturated unit deactivated for a length of time to permit adequate drying of the collecting cell. However, this also poses problems, since the consumer could easily forget to reactivate the unit, thereby compromising the effectiveness of the unit. In any event, the owner is required to remember to activate the unit after an appropriate period of time.

Another drawback of some electronic air filters is in the inability of the consumer to easily monitor the performance and operation of the filter. Since the electronic filter is normally silent the consumer may only visually check the position of the on/off switch, or pilot light for the unit, if any exists, to determine whether the unit is activated. The consumer cannot conveniently and easily check the performance or normal operating parameters of the collecting cell.

Finally, many of the prior art electronic air cleaners require a large amount of labor and high degree of expertise to install the mechanism within the central forced air system.

It is therefore a general object of the present invention to provide an improved electronic air filter.

Another object of the present invention is to provide an electronic air filter with a waterproof high voltage power supply mounted integrally within the filter frame such that only a low voltage line need extend from the filter frame to a household power supply.

A further object of the present invention is to provide an electronic air filter which may be folded to fit within the dimensions of a standard domestic automatic dishwasher.

Still another object of the present invention is to provide an electronic air filter with electrical shunts which will prevent arcing as the components of the collecting cell dry after cleaning.

Yet a further object is to provide an electronic air filter with performance indicator apparatus which permits the consumer to monitor the operation and performance of the filter.

Still another object of the present invention is to provide an electronic air filter which is simply and quickly installed in a central heating/cooling system, without requiring highly skilled technicians.

These and other objects of the present invention will be apparent to those skilled in the art.

SUMMARY OF THE INVENTION

The electronic air filter of the present invention includes a rectangular metal frame which supports a layered assembly composed of a metal grid interposed between a pair of sheets of nonconductive filter media, and a pair of metal grills located on opposite sides of the filter media to support the filter media sheets and grid. The frame and layered assembly form a collector cell, which has a power supply unit mounted therein and electrically connected to the grid and grills so as to form an electrostatic filter. The power supply unit is electrically connected to an electrical jack on the frame, with a power pack located remote of the collector cell and connected to the jack to provide low voltage electrical current to the power supply unit. The collector cell has dimensions corresponding to the dimensions of a conventional disposable filter, for direct substitution therewith. A plurality of strips of dense polyester felt material are connected between the grid and the grills to shunt electrical current to the grills when one or more of the strips are saturated with water, and to electrically insulate the grid from the grills when the strips are dry. The strips are arranged around the perimeter of the collector cell and are uniformly spaced apart. A second frame may be connected to the first frame to form an auxiliary filter which is pivotally connected so as to fold to a position adjacent and abutting one face of the first frame. The second frame also holds filter media between a pair of grills. Preferably, the power pack includes a lamp connected in series with at least one of the output leads of the power pack so as to indicate the flow of current through the output lead. An operable test button is mounted on the frame and includes an electrically grounded elongated prong projecting through an aperture in the frame. The prong is movable so as to project interiorly of the frame to a position adjacent the grid, whereby electrical current will arc between the grounded prong and the grid when the collector cell is in normal operating condition.

DESCRIPTION OF THE PREFERRED EMBODIMENT

Figure 2:
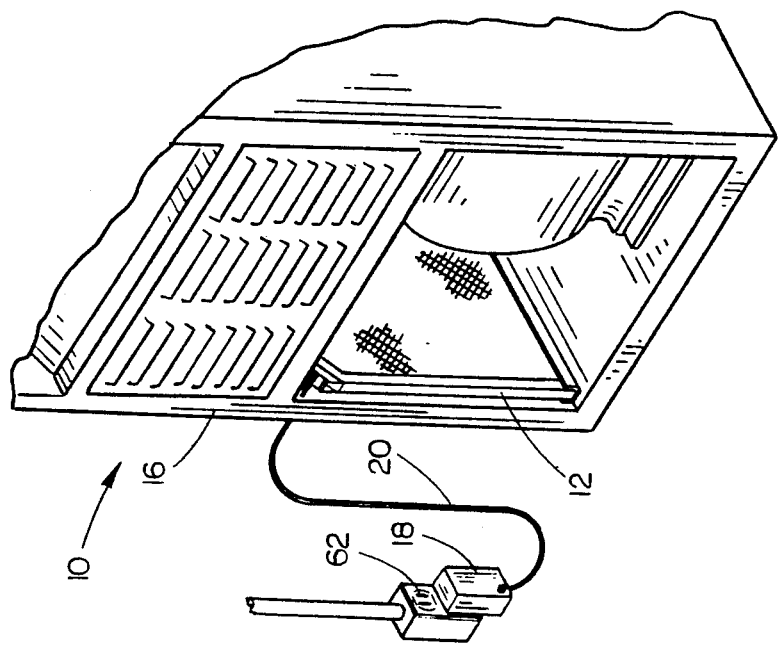
FIG. 2 is a view similar to FIG. 1, with the invention installed and operational.
Figure 1:
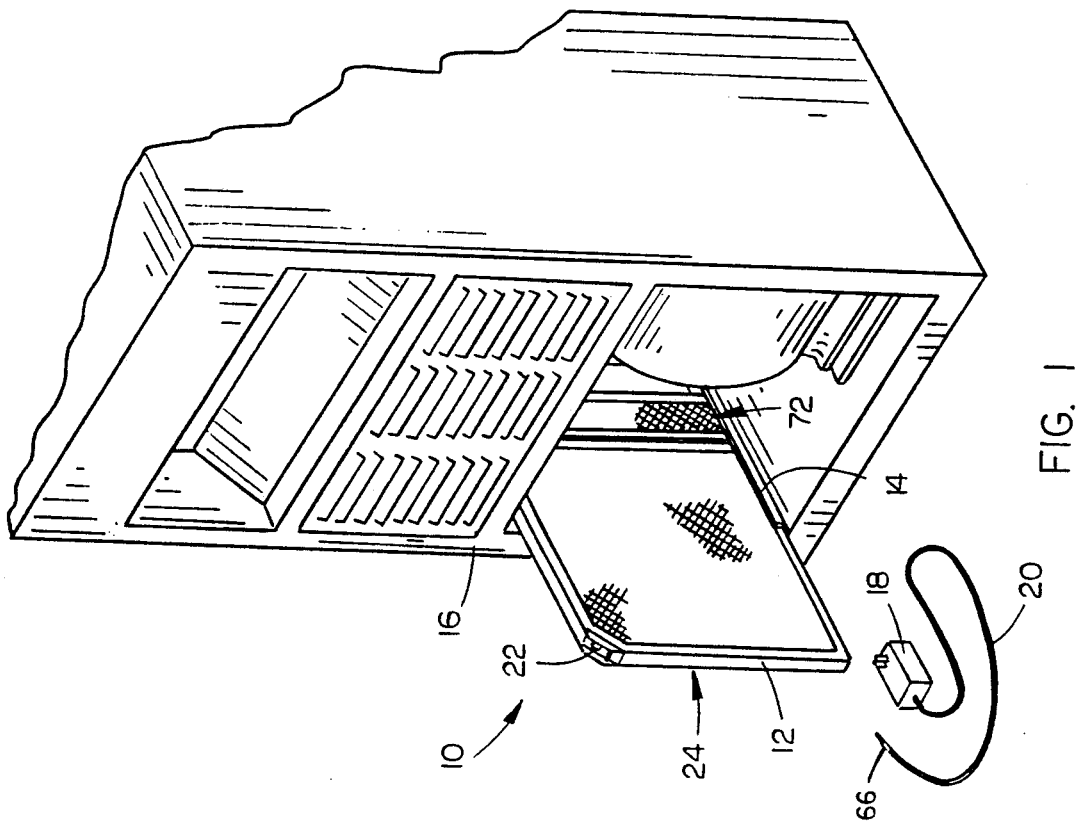
FIG. 1 is a perspective view of the electronic filter of the present invention partially installed within a conventional central forced air system with the blower compartment door removed.

Referring now to the drawings, in which similar or corresponding parts are identified with the same reference numeral, and more particularly to FIGS. 1 and 2, the electronic air filter of the present invention is designated generally at 10 and includes a metal frame 12 formed in dimensions equivalent to the conventional disposable filter, so as to permit installation within the existing channel-shaped brackets 14 in a blower compartment 16. A power pack 18 is provided which will convert standard 120 volt alternating current (AC) to low voltage 12 volt direct current (DC) and convey the low voltage current via electrical cord 20 to a power supply jack 22 on frame 12. Once installed and operational in blower compartment 16, the only external visible difference between electronic filter 10 and a conventional disposable filter is the electrical cord 20 extending from blower compartment 16. The functional differences, however, are dramatic, as described in more detail hereinbelow.

Figure 3:
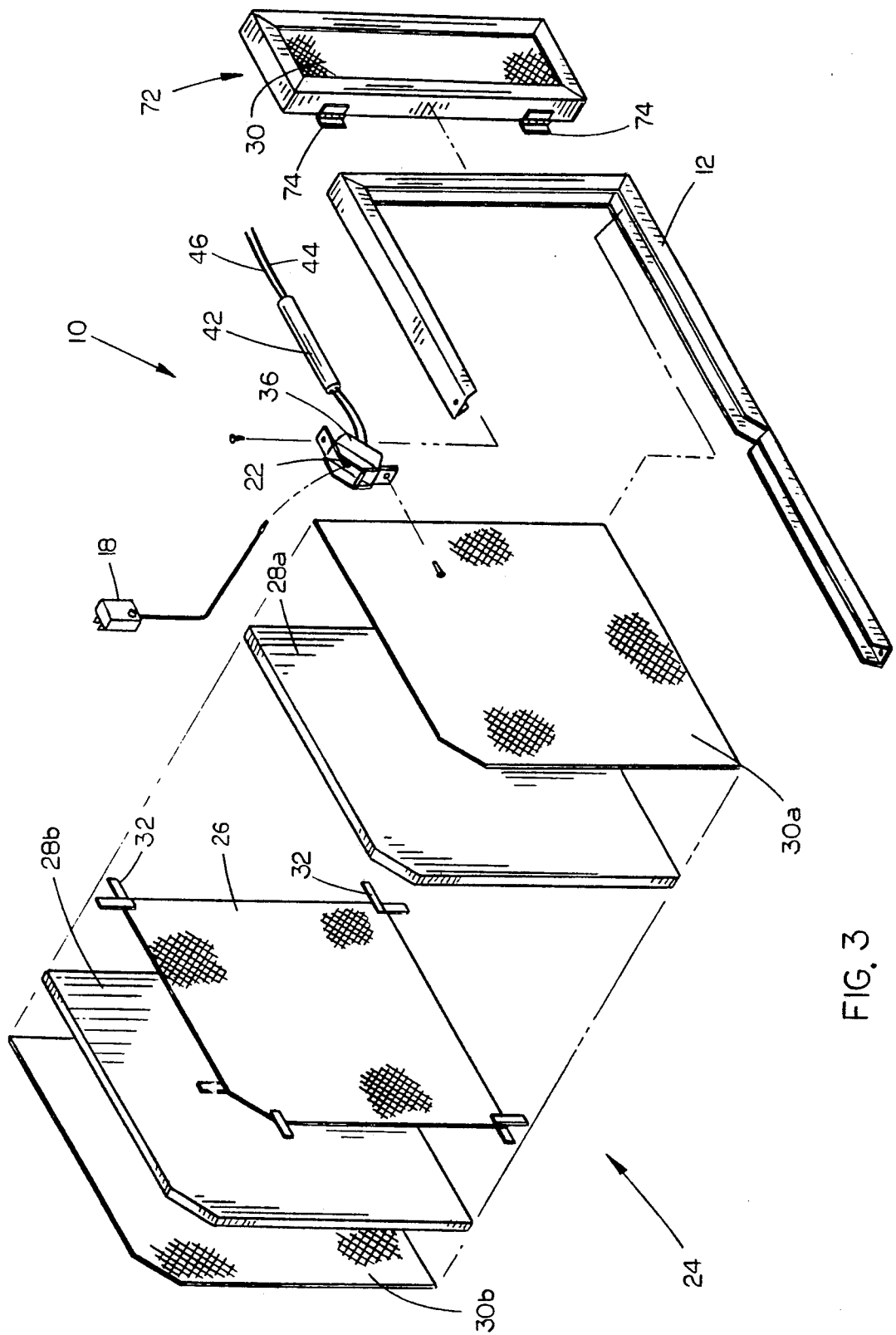
FIG. 3 is an exploded perspective view of the invention.

Referring now to FIG. 3, electronic air filter 10 includes a collecting cell designated generally at 24, which includes a high voltage grid 26 sandwiched between a pair of filter media elements 28a and 28b, and thence between a pair of filter grills 30a and 30b, all mounted within frame 12. High voltage grid 26 and filter grills 30a and 30b are plain flat blanks cut from galvanized woven steel wire, or the like, with openings large enough to permit the free flow of air. The filter media sheets 28a and 28b are cut from reticulated open pore polyurethane foam, or the like, and are formed with the same height and width dimensions as grills 30a and 30b. The high voltage grid 26 is smaller in length and width than filter media sheets 28a and 28b such that the entire grid 26 has a strip of filter media extending beyond the peripheral edge thereof. Grid 26 is thus totally surrounded by filter media 28, ensuring proper spacing between high voltage grid 26 and grills 30 and frame 12, once the assembly of grid 26, filter media sheets 28, grills 30, and frame 12 is formed.

Figures 6, 7:
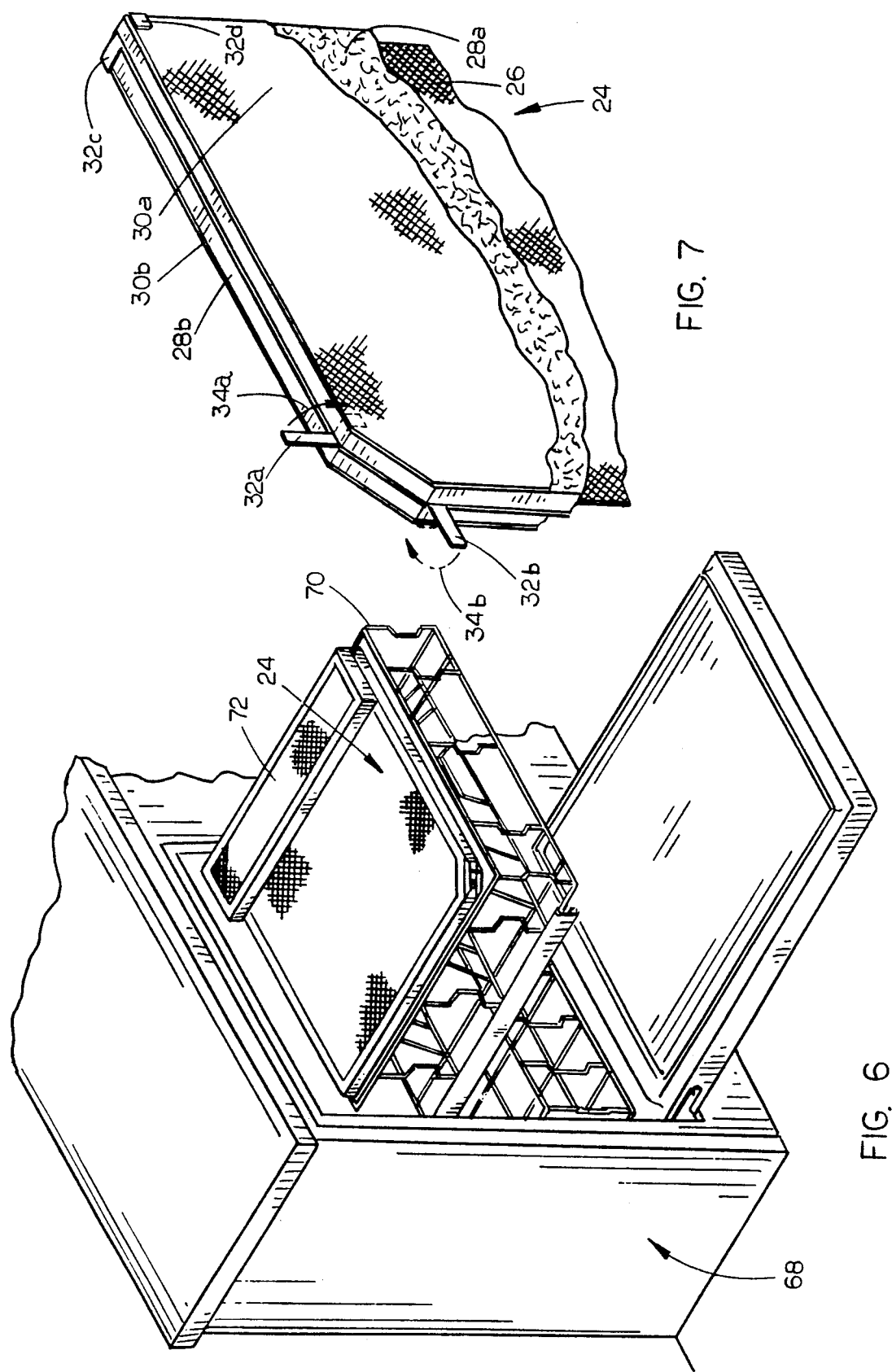
FIG. 6 is a perspective view of the invention positioned in a conventional dishwasher rack.
FIG. 7 is an enlarged perspective view of a portion of the invention with the exterior frame removed.

Preferably, eight short narrow strips of dense polyester felt material, or the like, are bonded to the corners of high voltage grid 26, with a pair of strips mounted perpendicularly and projecting from each corner of grid 26, as shown in FIG. 3. Once the assembly of grill 30a, filter media 28a, grid 26, filter media 28b, and grill 30b is combined into a stack, as shown in FIG. 7, strips 32 will project outwardly from the stack, as shown by strips 32a and 32b. Arrows 34a and 34b show how strips 32a and 32b are folded in opposite directions and bonded to opposing grills 30a and 30b respectively. Strips 32c and 32d are bonded to the opposing grills 30 at another corner of the collecting cell 24. This same sequence is utilized on all four corners of collecting cell 24 such that each corner has one felt strip connecting the grid 26 to one grill 30a and a second connector strip 32 connecting grid 26 to the opposing grill 30b.

Strips 32 form anti-arc shunts in collector cell 24. Each strip 32 forms a normally nonconductive link between grid 26 and grills 30 and frame 12. When collecting cell 24 is cleaned, all of shunt strips 32 become water saturated, and therefore electrically conductive. The location of shunt strips 32, as well as their mass and density, causes at least one of shunt strips 32 to be the last component of the collecting cell to dry. In this manner, the saturated shunt strips 32 (which do not arc while drying) will hold the power supply shorted, and therefore shut down, until all of the other components of the collecting cell have dried. Once the final shunt strip 32 has dried, it becomes nonconductive, thereby permitting the collecting cell to automatically revert to the normal electrified operating condition. Shunt strips 32 thereby prevent arcing between grid 26 and grills 30 or frame 12 during drying.

Figure 4:
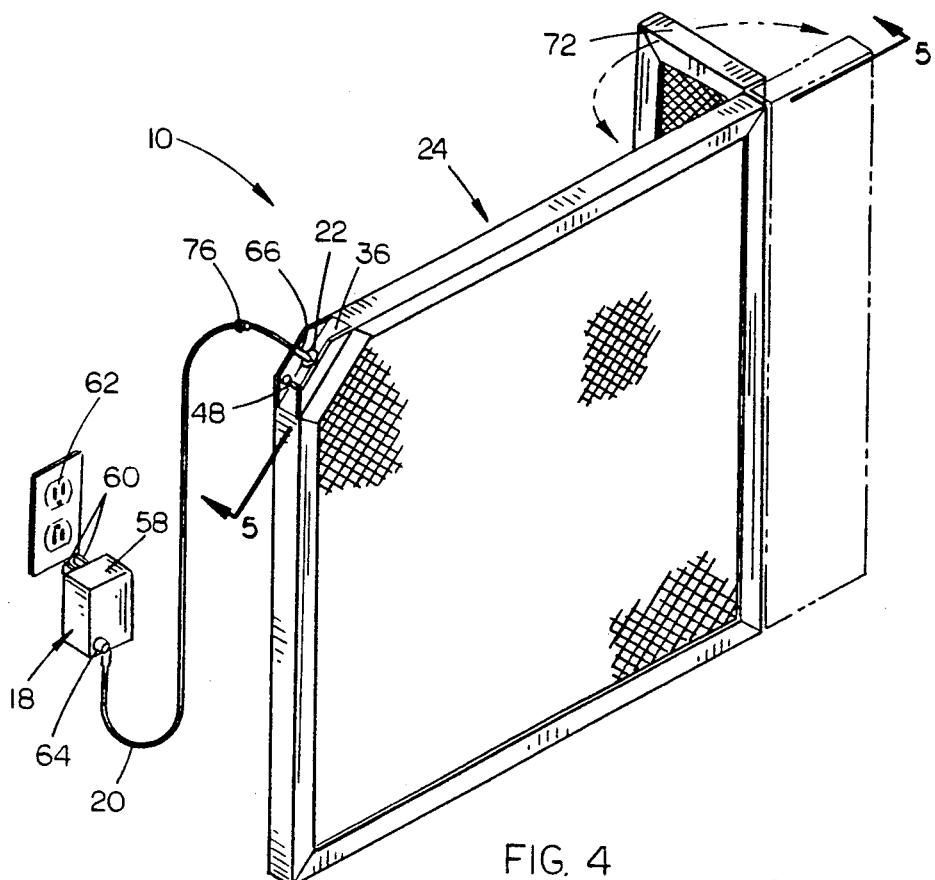
FIG. 4 is an enlarged perspective view of the present invention.
Figure 5:
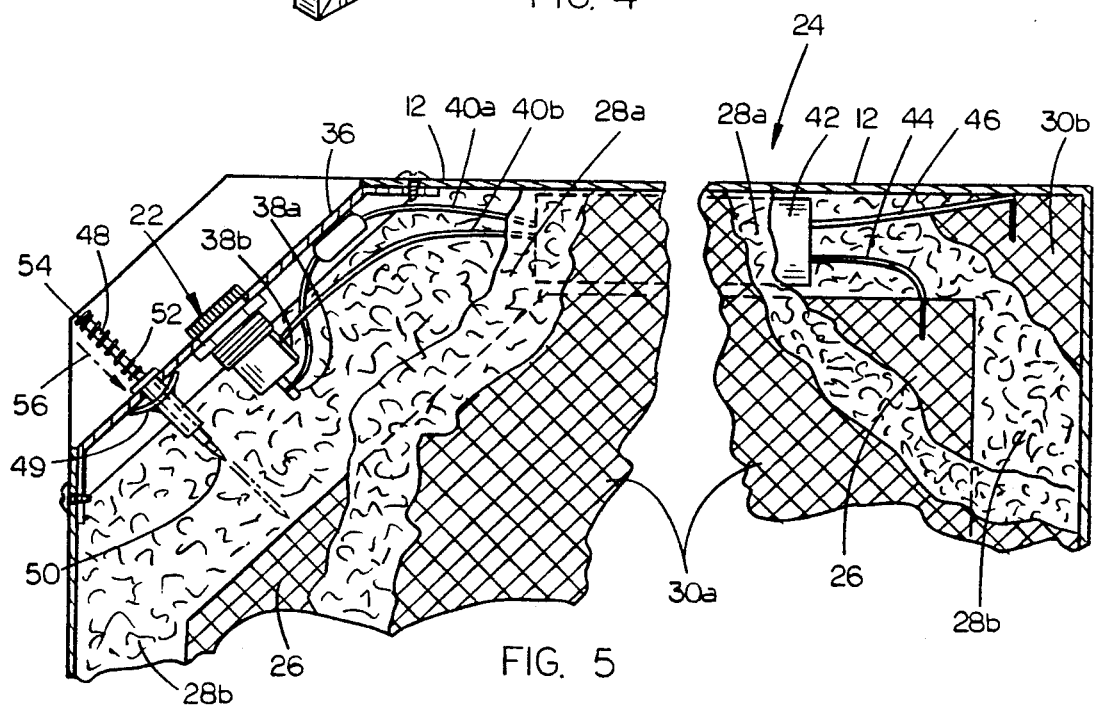
FIG. 5 is a sectional view taken at lines 5—5 in FIG. 4.

Referring now to FIGS. 4 and 5, power supply jack 22 is mounted in a corner piece 36 and has its pair of terminals 38a and 38b connected to the input leads 40a and 40b of a high voltage power supply unit 42. Supply unit 42 includes circuitry to elevate the incoming 12 volt current to approximately 6,500 volts—the circuitry being encapsulated within a tubular plastic molding impervious to dirt, water, cleansers and the like. The high voltage output lead 44 extends from power supply unit 42 and is electrically connected to grid 26. The neutral or ground lead 46 extends from power supply unit 42 and is connected to grill 30b. In this manner, power supply unit 42 is installed within frame 12 along with the grid 26, filter media 28 and grills 30, as an integral part of collecting cell 24.

A test button 48 is operably mounted through a metal bracket 49 in corner piece 36 and includes a metal prong 50 projecting through an aperture in corner piece 36, as shown in FIG. 5. Prong 50 is therefore continuously grounded through electrical contact with frame 12. A spring 52 on prong 50 biases prong 50 outwardly to a retracted position, as shown in solid lines in FIG. 5. Pushing on the head 54 of prong 50 will extend prong 50 inwardly, toward the edge of grid 26, as shown by arrow 56 and the broken line drawing of prong 50. When collector cell 24 is in a normal operating condition, movement of prong 50 towards high voltage grid 26 will cause high voltage arcing to occur, producing a clearly audible sound. Thus, test button 48 permits the consumer to readily confirm that collecting cell 24 is operating.

Referring now to FIG. 4, power pack 18 includes a sealed plastic housing 58 having standard plug input spades 60 on the rearward side for connection to a standard wall outlet 62. A performance indicator light 64 is mounted in the front face of the housing, and electrical cord 20 extends out the bottom thereof. Plug 66 is mounted on the free end of cord 20, and corresponds with jack 22, to electrically connect power pack 18 to power supply unit 42. Input spades 60 are connected within housing 58 to the primary of a step down transformer, the secondary of which feeds through a rectifier/filter system, a performance indicator circuit, and thence to the electrical cord 20.

The performance indicator circuit includes the performance indicator lamp 64 which will glow a constant dull orange color when power pack 18 and collecting cell 24 are operating normally. If indicator lamp 64 is completely off, this can indicate that power pack 18 is not energized, that low voltage plug 66 is not connected to collecting cell jack 22, or that collecting cell 24 is shorted and needs cleaning. If lamp 64 gives a constant fairly bright yellow glow, this indicates that the collecting cell is dirty and needs cleaning. If lamp 64 flashes intermittently, this indicates that the collecting cell is arcing and needs to be cleaned. Finally, if the indicator lamp 64 is initially very bright and then fades to completely off, this indicates that the collecting cell is wet and in the drying process. Thus, the consumer can view the performance indicator lamp 64 and immediately determine a variety of conditions of the electronic air filter 10.

As discussed hereinabove, conventional permanent electronic air filters are periodically cleaned and then reinstalled within the central forced air system. The simplest and most efficient method for cleaning such a filter is by use of a standard domestic automatic dishwasher such as that shown in FIG. 6 at 68. Because the standard size dishwasher 68 will not accommodate a filter having dimensions exceeding about 20 inches by 20 inches, many prior art air filters are not capable of being cleaned within a standard dishwasher. The inventor has overcome this problem by providing an auxiliary filter 72, as shown in FIGS. 1, 3, 4 and 6 which is pivotally connected to collecting cell 24 at hinges 74. In this way, auxiliary filter 72 will fold flat on top of collecting cell 24 so as to fit on rack 70 within dishwasher 68.

While auxiliary filter 72 may be connected to the electrical power supply unit 42, and provided with a high voltage grid, it is preferable to utilize only filter grills 30 and filter media 28 (not shown). Because the proportion of the total collecting cell face area accountable to the auxiliary filter 72 is rather insignificant, it does not appreciably reduce the effective air cleaning efficiency of the overall electronic air filter 10 to omit the electrical apparatus from auxiliary filter 72.

To install air filter 10, the conventional disposable filter is removed from blower compartment 16 and collecting cell 24 is installed in channels 14 as shown in FIG. 1. A ⅜ inch hole should be drilled in the blower compartment side panel to allow low voltage cord 20 to reach jack 22. A snub bushing 76 (see FIG. 4) is then inserted in the drilled hole in the side panel to seal the hole and protect the cord 20. Power pack 18 is then inserted in outlet 62 to activate filter 10.

Whereas the invention has been shown and described in connection with the preferred embodiment thereof, it will be understood that many modifications, substitutions and additions may be made which are within the intended broad scope of the appended claims. There has therefore been shown and described an improved electronic air filter which accomplishes at least all of the above stated objects.

I claim:

1. An air filter, comprising:
a generally rectangular metal frame supporting a layered assembly, including:
an electrically conductive grid interposed between first and second sheets of electrically nonconductive filter media; and
first and second electrically conductive grills located on opposing sides of said first and second filter media sheets;
said filter media sheets maintaining spacing between said grid and said grills and frame to prevent electrical contact therebetween;
power supply means electrically connected to said grid to supply high voltage electrical current thereto;
a first strip of absorbent material which is electrically nonconductive when dry and electrically conductive when wet, connected between said grid and said grills to shunt electrical current to said grills when the strip is saturated with water, and to electrically insulate said grid from said grills when said strip is dry;
said strip being formed of a material of greater density than said filter media.

2. The air filter of claim 1, wherein said strip is formed of dense polyester felt material.

3. The air filter of claim 1, further comprising a plurality of strips of absorbent material which is electrically nonconductive when dry and electrically conductive when wet, connected between said grid and said grills and spaced around said grills and spaced from said first strip, said plurality of strips formed of a material of greater density than said filter media.

4. An air filter, comprising:
a generally rectangular first metal frame supporting a layered assembly, including:
an electrically conductive grid interposed between first and second sheets of electrically nonconductive filter media; and first and second electrically conductive grills located on opposing sides of said first and second filter media sheets;

said filter media sheets maintaining spacing between said grid and said grills and frame to prevent electrical contact therebetween;

power supply means electrically connected to said grid to supply high voltage electrical current thereto;

said first frame having upper and lower frame members, first and second side frame members and forward and rearward faces;

a second frame having upper and lower frame members and first and second side frame members, pivotally connected to said first side frame member for pivotal movement about a single, fixed pivotal axis;

said second frame having a width, as measured along said side frame members equal to the width of the first frame;

said second frame pivotally connected for movement between an operable position coplanar with the first frame, and a cleaning position parallel with and abutting the rearward face of said first frame;

said second frame supporting filter media material for filtering air.

5. An air filter, comprising:

a generally rectangular metal frame including upper and lower frame members connected between opposing side frame members;

each of said frame members having at least an exteriorly-facing surface and an interiorly-facing surface;

said frame supporting a layered assembly, between the interiorly-facing surfaces of said frame members, interiorly of said frame, including:

an electrically conductive grid interposed between and supported by first and second sheets of electrically nonconductive filter media;

first and second electrically conductive grills located on opposing sides of and supporting said first and second filter media sheets;

said filter media sheets maintaining spacing between said grid and said grills and frame to prevent electrical contact therebetween;

said frame and layered assembly forming an air filtering collector cell;

an electrical jack mounted on said frame, having a pair of electrical terminals projecting interiorly of said frame;

a power supply unit supported interiorly of said frame having a pair of input leads connected to the terminals of the jack, and first and second output leads, for providing high voltage electrical current to said grid;

said first output lead connected to said grid to provide high voltage thereto;

said second output lead connected to at least one of said grills;

said power supply unit including an electrical circuit encapsulated within a water impervious housing;

said electrical circuit having means for transforming low voltage electrical current to high voltage electrical current; and means electrically connected to said jack for providing low voltage electrical current to said power supply unit.

6. The air filter of claim 5, wherein said means for providing low voltage electrical current to said power supply unit includes power pack means electrically and removably connected to said jack.

7. The air filter of claim 6, wherein said power pack means includes:

a housing having a pair of electrical input spades for connection to a standard wall outlet;

electrical circuit means within said housing for transforming household 120 volt alternating current to low voltage direct current;

a pair of output leads with an electrical plug corresponding with said jack, connecting said electrical circuit means to said power supply unit to supply low voltage current thereto; and visual indicator means electrically connected tin said circuit means to indicate the flow of current to said output leads;

said visual indicator means including a lamp connected in series with one of said output leads of the power pack means.

* * * * *